(12) United States Patent
Arima (10) Patent No.: US 7,909,405 B2
(45) Date of Patent: Mar. 22, 2011

(54) ARRANGEMENT OF OPERATION UNIT IN SEAT BACK

(75) Inventor: Hiroshi Arima, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 71 days.

(21) Appl. No.: 12/410,706

(22) Filed: Mar. 25, 2009

(65) Prior Publication Data

US 2010/0244514 A1    Sep. 30, 2010

(51) Int. Cl.
*B60N 2/20*    (2006.01)
*B60N 2/36*    (2006.01)

(52) U.S. Cl. ............................... 297/378.12; 297/378.13

(58) Field of Classification Search ............. 297/378.12, 297/378.13
See application file for complete search history.

(56) References Cited

U.S. PATENT DOCUMENTS

| | | | | |
|---|---|---|---|---|
| 5,700,056 | A * | 12/1997 | Bernard | 297/378.13 |
| 5,762,401 | A * | 6/1998 | Bernard | 297/378.13 |
| 6,139,076 | A * | 10/2000 | Hara et al. | 292/336.3 |
| 6,312,055 | B1 * | 11/2001 | Uematsu | 297/378.13 |
| 6,386,637 | B1 * | 5/2002 | Okazaki et al. | 297/378.12 |
| 7,404,605 | B2 * | 7/2008 | Inoue et al. | 297/378.13 |
| 7,410,217 | B2 * | 8/2008 | Inoue et al. | 297/378.13 |
| 7,494,187 | B2 * | 2/2009 | Inoue et al. | 297/378.13 |
| 7,635,166 | B2 * | 12/2009 | Ishikawa | 297/463.1 X |
| 7,641,282 | B2 * | 1/2010 | Hinata et al. | 297/378.13 X |
| 2007/0200410 | A1 * | 8/2007 | Inoue et al. | 297/378.13 |
| 2007/0200411 | A1 * | 8/2007 | Inoue et al. | 297/378.13 |
| 2010/0213747 | A1 * | 8/2010 | Lindsay | 297/378.13 |
| 2010/0237673 | A1 * | 9/2010 | Lindsay | 297/378.13 |

FOREIGN PATENT DOCUMENTS

| | | |
|---|---|---|
| JP | 2005-80740 A | 3/2005 |
| JP | 2006-261616 A | 9/2006 |

* cited by examiner

*Primary Examiner* — Rodney B White
(74) *Attorney, Agent, or Firm* — Browdy and Neiamrk, PLLC (57) ABSTRACT

An arrangement of operation unit in one upper corner portion of seat back of automotive seat is disclosed, in which an operating lever of the operation unit is accommodated in a housing fixed to a connecting bracket disposed in such one upper corner portion, and a shape retaining bracket is fixed to the connecting bracket to retain the peripheral edge region of opening of a trim cover assembly through which an operating lever of the operation unit projects outwardly. The peripheral edge region is inserted between the shape regaining bracket and a bezel, and further, the connecting bracket, housing and trim cover assembly are connected with one another at a connecting point, thereby effectively retaining the peripheral edge region of opening of the trim cover assembly in a predetermined shape conforming to outer contour of the one upper corner portion of seat back.

6 Claims, 5 Drawing Sheets

ARRANGEMENT OF OPERATION UNIT IN SEAT BACK

BACKGROUND OF THE INVENTION

1. Field of the Invention

The present invention relates to an operation unit by which a user can adjustably move a seat back of an automotive seat, such as an operation unit for causing folding of the seat back down onto a seat cushion of the automotive seat. In particular, the invention is directed to an arrangement of such operation unit in the seat back.

2. Description of Prior Art

There has been known a seat back operation unit for a user to operate the operation lever thereof to cause a seat back of automotive seat to fold down to a seat cushion of the seat, and, such seat back operation unit is typically provided in the top of the seat back so as to face forwardly of the seat back, as disclosed from the Japanese Laid-Open Patent Publication No. 2005-80740 for instance.

According to the foregoing conventional seat back operation unit, the operation lever may be moved forwardly to thereby draw a wire connected with that operation lever so as to release the seat back from a locked state, so that the seat back will be folded down onto a seat cushion. This seat back operation unit is disposed at predetermined top and frontal area of the seat back which extends from the top of the seat back to a localized frontal surface region of the seat back. For that purpose, trim cover assembly and foam padding, forming a constituent part of the seat back, is cut off at a point corresponding to the afore-said top and frontal area of seat back so as to provide an opening in which mechanical parts and elements of the seat back operation unit are installed, and of course, an operation lever is disposed in the opening of the trim cover assembly. In this regard, an annular piece or bezel of synthetic resin material is secured to and along the peripheral edge of that opening of trim cover assembly, so as to surround the operation lever, thereby preventing removal of that particular peripheral edge of opening of trim cover assembly from the foam padding.

It is desired that the seat back operation unit be disposed at one corner area in the top region of seat back, so that the operation lever thereof may be readily accessed and easily operated by a user. Such one corner area in the top region of seat back refers to one of left and right corner areas in the top of seat back, and shall be referred to "one upper corner area of seat back" hereinafter.

Practically, if the previously stated prior-art seat back operation unit is disposed in the afore-said one upper corner area of seat back, it is apparent that the seat back operation unit and operation lever extend therein so as to cover the following three localized areas of seat back: a top area of seat back; a frontal area of seat back; and a lateral area of seat back. As a result thereof, if the trim cover assembly and foam padding is cut off in correspondence with such one upper corner area of seat back to provide an opening there, the peripheral edge of resultant opening of the trim cover assembly is deformed into an undesired irregular shape, which will impair the aesthetic appearance of one upper corner area of seat back.

Further, the seat back operation unit itself is composed of a great number of mechanical parts and elements, and therefore, it is technically difficult to assemble and secure those mechanical parts and elements in the afore-said opening at the one upper corner area of seat back in such a manner to prevent them from being viewed from the outside.

SUMMARY OF THE INVENTION

In view of the above-stated drawbacks, it is a purpose of the present invention to provide an improved arrangement of operation unit in a seat back, wherein said seat back includes: one upper corner portion having a predetermined outer shape; a seat back frame including an upper corner frame region disposed corresponding to an upper corner of said seat back; a padding; and a trim cover assembly covering said padding, wherein said operation unit includes an operating lever operatively provided therewith, wherein said padding has a bore formed therein at a point corresponding to said one upper corner portion of the seat back, while likewise, said trim cover assembly has an opening formed therein at a point corresponding to said one upper corner portion of the seat back, wherein a body of said operation unit is disposed within said bore of said padding, with said operating lever is disposed so as to project outwardly from said opening of said trim cover assembly, said arrangement being characterized in that:

said trim cover assembly includes a connecting area defined near to said opening thereof, and said operation unit comprises:

a connecting bracket of substantially U-shaped configuration, said connecting bracket having an opening defined in the backward side thereof and being fixed to said one corner frame region of said seat back frame;

said connecting bracket further having a projected portion formed therewith;

a housing accommodating a part of said operating lever therein, said housing being bodily disposed in said connecting bracket and having a projected portion formed therewith;

a shape retaining bracket so configured to contact and retain a peripheral edge region of said opening of said trim cover assembly in a shape conforming to said predetermined outer shape of said one corner portion of said seat back, and said shape retaining bracket being securely connected with said connecting bracket and having an inward opening region smaller in size than a substantially circular region circumscribed by said peripheral edge region of said opening associated with said trim cover assembly;

a bezel is provided, which has an outer contour small in size than said inward opening region of said shape retaining bracket, said bezel being adapted for covering an space between said shape retaining bracket and said operating lever, and said arrangement being further characterized that said peripheral edge region of said opening of said trim cover assembly is inserted between said bezel and said shape retaining bracket, and that said projected portion of said connecting bracket, said projected portion of said housing and said connecting area of said trim cover assembly are securely connected with one another.

As one preferred aspect of the present invention, said shape retaining bracket is integrally connected with an outer side of said connecting bracket, said housing has a through-hole formed in said projected portion thereof, and said bezel has a connecting portion firmly connected, via said through-hole of said housing, with said projected portion of said connecting bracket.

As another preferred aspect of the invention, said housing is provided with a pin at the base portion thereof, whereas said connecting bracket has a locating hole formed therein, and said pin is inserted in said locating hole.

Another features and advantages of the present invention will become apparent from reading of the description, hereinafter, with reference to the annexed drawings.

DETAILED DESCRIPTION OF PREFERRED EMBODIMENT OF THE INVENTION

Referring to FIGS. 1 through 11, there is illustrated an arrangement of operation unit, as generally designated by (A), in seat back in accordance with the present invention.

Figure 1:
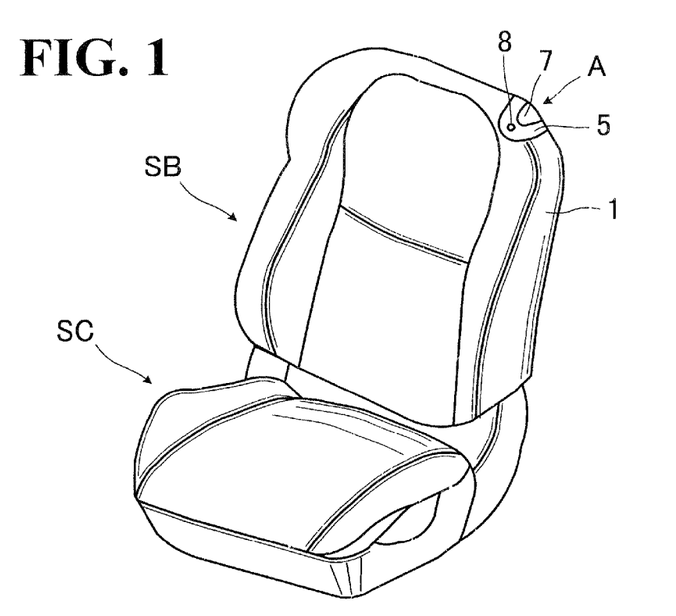
FIG. 1 is a perspective view showing an automotive seat having a seat back to which an arrangement of operation unit of the present invention is applied.

FIG. 1 shows an automotive seat used in the present invention, in which a seat back thereof (SB) includes one upper corner portion (CR). Designation (SC) denotes a seat cushion of the seat. The seat back (SB) may be automatically folded down on to the seat cushion by means of an operation unit to be described later.

As seen from FIG. 1, the upper corner portion (CR) extends the following three surface regions of the seat back (SB): a frontal surface region; a top surface region and a lateral surface region.

The arrangement of operation unit (A) includes an operating lever (7) and an operating button (8). By drawing forwardly the operating lever (7), the seat back (SB) is released from a locked state, so that the seat back (SB) is folded down onto the seat cushion (SC). And, by pressing the operating button (8), a slide rail device, which is provided under the seat cushion (SC) and electrically connected to a motor, is operated to cause forward and backward sliding movement of the seat cushion along slide rails.

The foregoing operation unit (A) is provided in an throughbore formed in both of trim cover assembly (1) and foam padding (9) at a point corresponding to the upper corner portion (CR).

Figure 6:
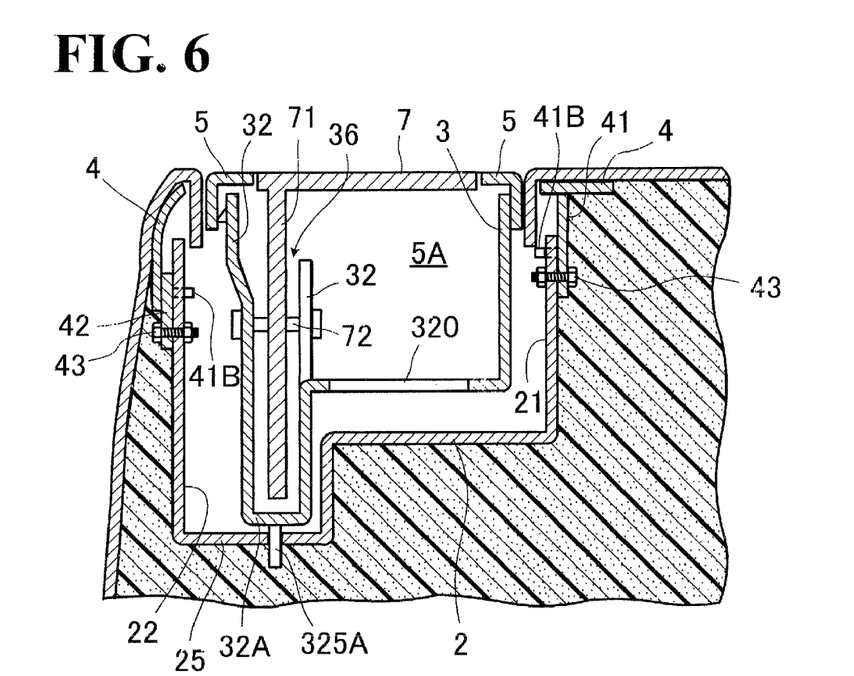
FIG. 6 is a sectional view taken along the line VI-VI in the FIG. 2.

As shown in FIG. 6, the operation unit (A) is basically comprised of: a connecting bracket (2); a housing (3); a shape retaining bracket (4); and a generally circular decorative piece or a bezel (5).

The connecting bracket (2) formed from a metallic plate into the illustrated generally U-shaped configuration having a rearward opening defined in the rearward portion thereof, wherein such rearward portion is integrally connected by bolt with a connecting piece (60) welded to a frame portion (6) of a seat back frame associated with the seat back (SB).

Designations (61) and (62) denote first and second connecting portions of the connecting bracket (2). The first and second connecting portions (61) and (62) are formed with a securing hole (61A) and a securing hole (62A), respectively, which are each adapted to be threadedly engaged with a bolt for connecting purpose.

Figure 5:
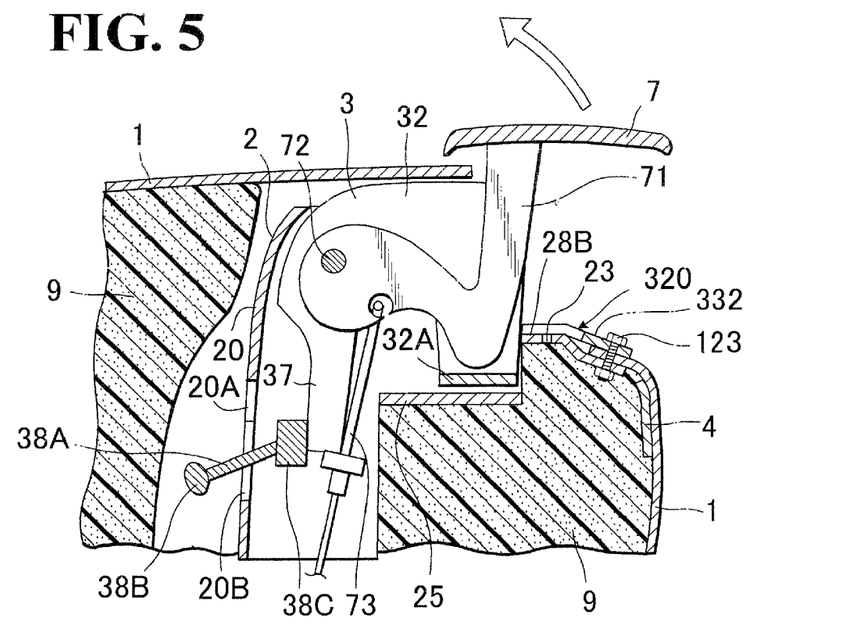
FIG. 5 is a fragmentary sectional view of a principal part of the invention, in which a bezel is removed therefrom.
Figure 7:
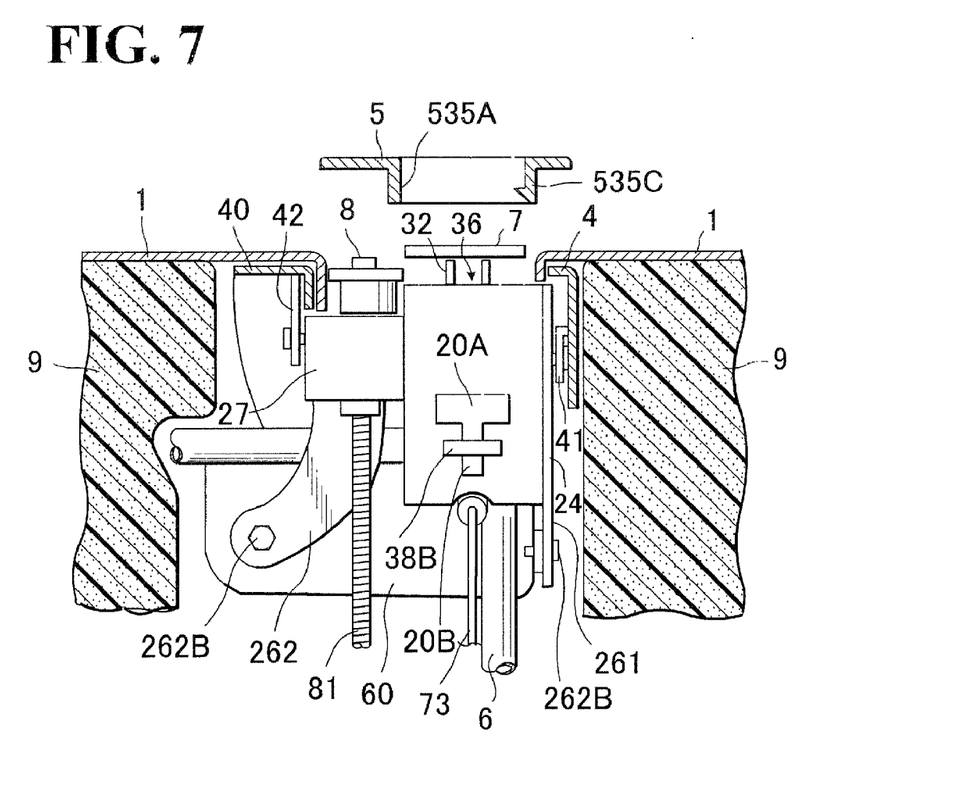
FIG. 7 is a sectional view taken along the line VII-VII in the FIG. 2.
Figure 8:
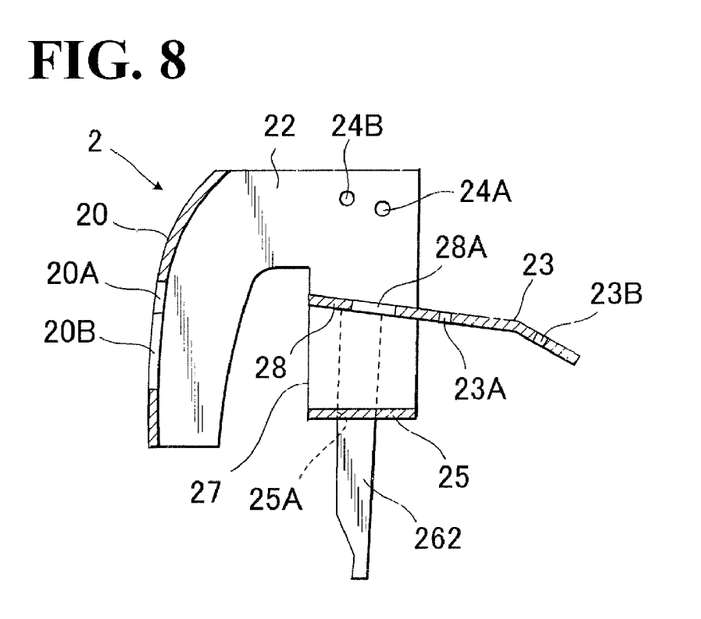
FIG. 8 is a sectional view taken along the line VIII-VII in the FIG. 3.

As shown in FIGS. 5 to 7, the connecting bracket (2) has a pair of lateral plate portions (24) and (24) which have first and second leg portions (261) and (262), respectively. The first and second leg portions (261) (262) are firmly coupled, as by bolts (262B), with the first and second connecting portions (61) (62), respectively. Designations (261A) and (262A) denote a securing holes in which the bolts (262B) and (262B) are secured.

The rearward portion of the connecting bracket (2) is formed in generally "L" shape so configured to accommodate the housing (3) therein. The frontal plate portion (20) of the connecting bracket (2) has, formed therein, a transverse through-hole (20A) and a guide hole (20B). The transverse through-hole (20A) extends in a direction transversely of the frontal plate portion (20), whereas the guide hole (20B) communicates with a central point of that transverse through-hole (20A) and extends downwardly from the latter. As shown, a generally T-shaped guide member (38), formed in the forward distal end portion (37) of the housing (3), passes through the afore-said transverse through-hole (20A).

The two lateral plate portions (24) of the connecting bracket (2) are each formed with a a first connecting hole (24A) and a second connecting hole (24B). The connecting portions of the shape retaining bracket (4) are firmly connected, as by screws, with the afore-said first connecting hole (24A), whereas the pins (41B) provided in the inner surfaces of the shape retaining bracket (4) are securely engaged with the afore-said second connecting hole (24B), so that the shape retaining bracket (4) is fixedly connected with the connecting bracket (2).

As shown in FIG. 7, the connecting bracket (2) has a securing plate portion (28) formed integrally with one of the two lateral plate portion (24) thereof, the securing plate portion (28) being disposed above the base plate portion (25) of the connecting bracket (2). This securing plate portion (28) is provided with a projected piece (23) projecting rearwardly. The projected piece (23) is formed with: a first connecting hole (23A) for connecting the bezel (5) therewith; and a second connecting hole (23B) through which the housing (3) and the peripheral edge region (1A) of the trim cover assembly (1) are connected with each other.

The afore-said securing plate portion (28) is also formed with a through-hole (28A) through which a mechanical part (81) of the operating button (8) extends. The base plate portion (25) is formed with a locating hole (25A) into which is inserted a pin (325A) associated with the housing (3) as seen in FIG. 2.

Designation (21) denotes one upper lateral region integral with one of the two lateral plate portions (24) as well as with the frontal plate portion (20). Designation (22) denotes another upper lateral region integral with another of the two lateral plate portions (24) as well as with the frontal plate portion (20). The forward end portion (37) of the housing (3) is accommodated and disposed in a space defined among those two upper lateral regions (21) (22) and frontal plate portion which are associated with the connecting bracket (2).

An arm (71) integral with the operating lever (7) is rotatably pivoted in the housing (3). One end of the arm (71) is connected with a wire (73) operatively connected with an unlocking mechanism (not shown). Designation (37) denotes an arm housing region of the housing (3) in which such arm (71) is accommodated.

Figure 2:
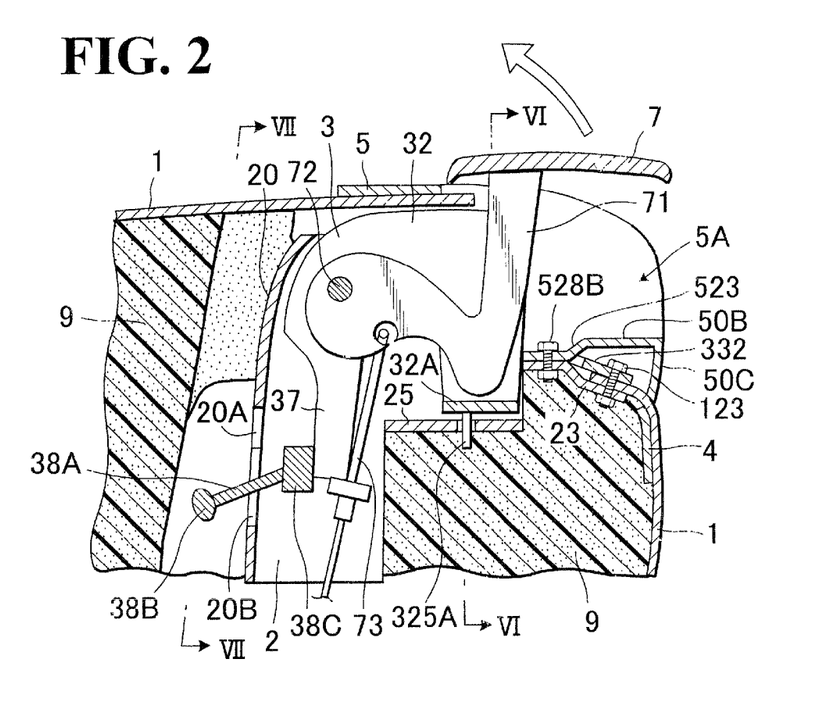
FIG. 2 is a fragmentary sectional view of a principal part of the present invention.

When the operating lever (7) is drawn forwardly in the direction of arrow as in FIG. 2, the arm (71) is rotated against a biasing force of a return spring (not shown), which causes the wire (73) to move in the same direction to thereby actuate the unlocking mechanism (not shown) to release the seat back (SB) from a locked state.

Designation (36) denotes a slit formed in the arm housing region (37), the slit being adapted for allowing the arm (71) to rotate therethrough. Designation (73A) denotes a sleeve of the wire (73).

The previously stated generally T-shaped guide member (38) is integrally formed on the distal forward end of the arm housing region (37) of housing (3) so as to project forwardly. The guide member (38) has: a base portion (38C) integral with the housing (3) a slide guide portion (38A) projected from that base portion (38C); and a stopper portion (38B) formed integrally on the free end of the slide guide portion (38A) so as to extend transversely relative to a central axis of that particular slide guide portion (38A).

As shown, the arm housing region (37) includes a pair of lateral wall portions defined symmetrically relative to the slit (36). Such two lateral wall portions are each formed with a protrudent stopper piece (35C) integrally. With this arrangement, when the housing (3) is accommodated in the connecting bracket (2), the two lateral plate portions (21) and (22) of the connecting bracket (2) contact the afore-said two stopper pieces (35C), respectively, so that the housing (3) is prevented against wobbling and rattling in a direction transversely of the connecting bracket (2).

One of the two lateral wall portions of the arm housing region (37) is formed with an engagement projection (35A) with which the bezel (5) is engaged.

The arm housing region (37) has a top wall portion in which the aforementioned operating button (8) is provided so as to project upwardly therefrom, and such top wall portion is formed with a pair of securing holes (35B) and (35B) to which the two securing lugs (535B) and (535B) of the bezel (5) are securely engaged, respectively. Thus, it is to be seen that the bezel (5) is securely attached to Te upper corner portion of the seat back (SB) so as to cover the upper side of the housing (3).

Figure 9:
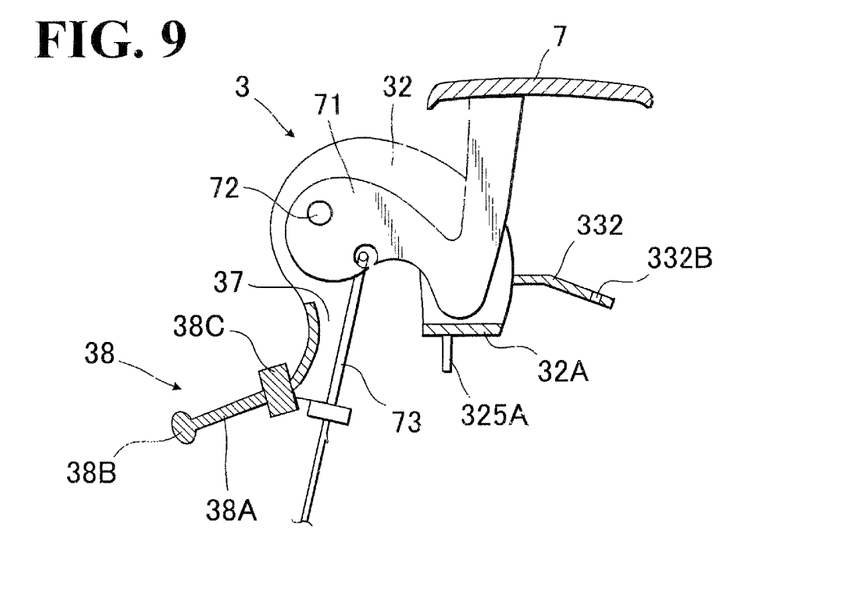
FIG. 9 is a sectional view taken along the line IX-IX in the FIG. 3.

As understandable from FIGS. 2, 5 and 9, the housing (3) has a connecting region to be juxtaposed and contacted on the securing plate portion (28) of the connecting bracket (2), and such connecting region is formed with a through-hole (320). Hence, when the housing (3) is assembled with the connecting bracket (2), the connecting hole (23A) associated with the connecting bracket (2) is disposed in the through-hole (320) and exposed outwardly therethrough, so that the bezel (5) is connected via that connecting hole (23A) with the connecting bracket (2).

The housing (3) also has an connecting extension (332) integral with the afore-said connecting region, and as seen in FIG. 2, such connecting extension (332) is disposed corresponding to and above the projected piece (23) of the connecting bracket (2).

The peripheral edge portion (1A) defined along the opening (10) of trim cover assembly (1) is partly sandwiched between the foregoing connecting extension (332) and projected piece (23), and, as shown in FIG. 2, those three all elements (1A, 332 and 23) are securely connected together and retained by means of securing bot and nut.

In this context, as understandable from the Figures, the upper corner portion (UR) of seat back (SB) is formed such that the corresponding portion of the foam padding (9) is formed with a through-bore in which all mechanical parts of the operation unit, disposed under the operating lever and button (7) and (8), are accommodated. Such through-bore is large in diameter and size than the opening (10) of trim cover assembly (1).

The arm housing region (37) of the housing (3) has a bottom area (32A) defined in the lower portion thereof, and a pin (325A) is integrally attached to that bottom area (32A) so as to project downwardly therefrom. The pin (325A) is inserted in the locating hole (25A) of the connecting bracket (2).

The shape retaining bracket (4) is so formed to be contacted with and along the reverse side of the peripheral edge region (1A) of the opening (10) formed in the trim cover assembly (1) and retain that peripheral edge region (1A) in a proper shape conforming to a contour of the one upper corner portion (UR) of the seat back (SB). In this respect, it is to be understood that such contour of one upper corner portion expands the corresponding top area, frontal area and one lateral area (e.g. left-side lateral area) of the seat back (SB), as seen from FIG. 1.

Figure 10:
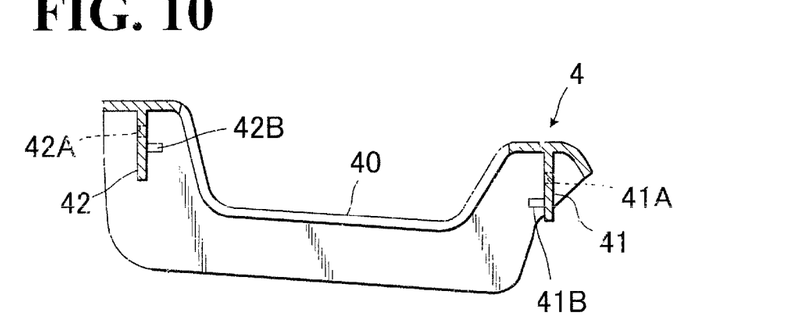
FIG. 10 is a sectional view taken along the line X-X in the FIG. 3.
Figure 11:
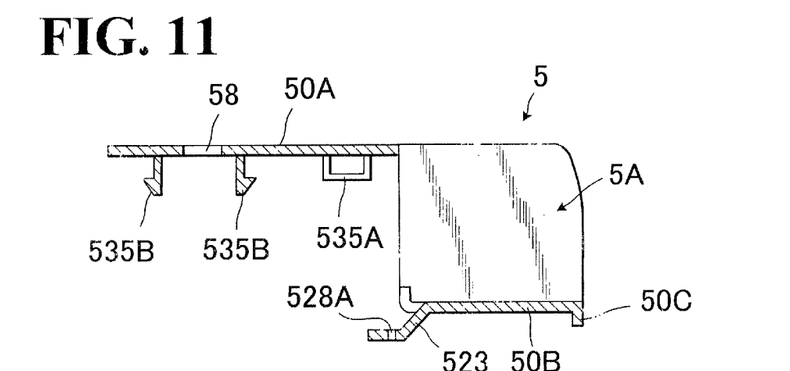
FIG. 11 is a sectional view taken along the line XI-XI in the FIG. 3.

As shown in FIG. 10, the body portion (40) of the shape retaining bracket (4) has, formed in the reverse side thereof, a first connecting piece (41) and a second connecting piece (42) in an integral manner. The first connecting piece (41) is formed with a through-hole (41A) and a pin (41B), whereas the second connecting piece (42) is formed with a through-hole (42A) and a pin (42B). As shown in FIG. 6, the first and second connecting pieces (41) (42) of the shape retaining bracket (4) is firmly coupled with the two lateral portions (24) of the connecting bracket (2), respectively, by inserting the two pins (41B) (42B) of the shape retaining bracket (4) in the respective two holes (24A) of the connecting bracket (2), and inserting one securing screw (43) through the aligned two through-holes (41A) (24B) and securely engaged with a nut, while inserting another securing screw (43) through the aligned two through-holes (41B) (24B) and securely engaged with a nut.

The bezel (5) is so formed to cover the upper side of the operation unit, excepting the operating lever (7) and the upper side of the housing (3), and give a clearance between the outer end thereof and the connecting bracket (2), the clearance being substantially equal to a thickness of the trim cover assembly (1). The body (50) of the bezel (5) has, formed in the reverse side thereof, a pair of engagement pieces (535B) and (535B) and an engagement ring (535A). The two engagement pieces (535B) are engaged with two engagement holes (35B) (35B) formed in the housing (3). The engagement ring (535A) is engaged with a engagement projection (35A) formed in the housing (3). Designation (58) denotes a though-hole through which the operating button project outwardly.

The bezel (5) has a generally U-shaped lower region (50B) which is disposed under and concealed by the operating lever (5). As seen in FIG. 2, such lower region (50B) has, formed in the inward edge portion thereof, a connecting lug (523) which is firmly connected by a securing screw (528B) and nut with the projected piece (23) of the connecting bracket (2).

Designation (528A) denotes a through-hole formed in the connecting lug (523), through which the securing screw (528B) passes. Designation (57) denotes an opening of the bezel (5). Designation (5A) denotes an opened area of the bezel (5) which makes a finger of a user accessible to the operating lever (7). Designation (50) denotes an engagement projection formed in the inward surface of the outer wall of the bezel (5), the engagement projection being slightly inclined inwardly of the bezel (5).

The opening (10) of the trim cover assembly (1) is slightly larger in outer size than the foregoing bezel (5). Formed in the peripheral edge region (1A) of that opening (10) are: one through-hole (12) through which the operating button (8) passes; and another through-hole (11) which is connected with the projected piece (23) of the connecting bracket (2) as well as with the connecting piece (332) of the housing (3) by means of the securing screw (123).

A description will now be made of the steps for attaching the above-described operation unit (A) in the one corner portion (UR) of seat back (SB).

Before assembly of the seat back (SB), the connecting bracket (2) is fixedly connected to the connecting piece (60) of seat back frame (6) by securely connecting the two leg portions (261) (262) of the connecting bracket (2) with the two connecting portions (61) (62), respectively, by means of securing bolts and nuts (e.g. at 262B).

The transverse stopper portion (38B) of the guide member (38) associated with the housing (3) is inserted through the transverse through-hole (20A) of the foregoing connecting bracket (2), and then, the slide guide portion (38A) of the guide member (38) is slidingly moved in and along the guide hole (20B) of the connecting bracket (2). At this time, the pin (325A) of the housing (3) is inserted in the locating hole (25A) of the connecting bracket (2). As a result thereof, it is seen that the two projections (32A) of the housing (3) are disposed adjacent to the corresponding inward surfaces of the connecting bracket (2).

Under such state, the shape retaining bracket (4) is firmly attached to the connecting bracket in the manner described previously.

Then, the peripheral edge region (1A) of opening (10) of trim cover assembly (1) is juxtaposed and contacted upon the outer surface of the shape retaining bracket (4), with care being taken to insure that the operating button (8) passes through the previously stated one through-hole (12) of the trim cover assembly (1) so as to project outwardly, thereby locating the trim cover assembly (1) at a predetermined position relative to the housing (3).

Figures 3, 4:
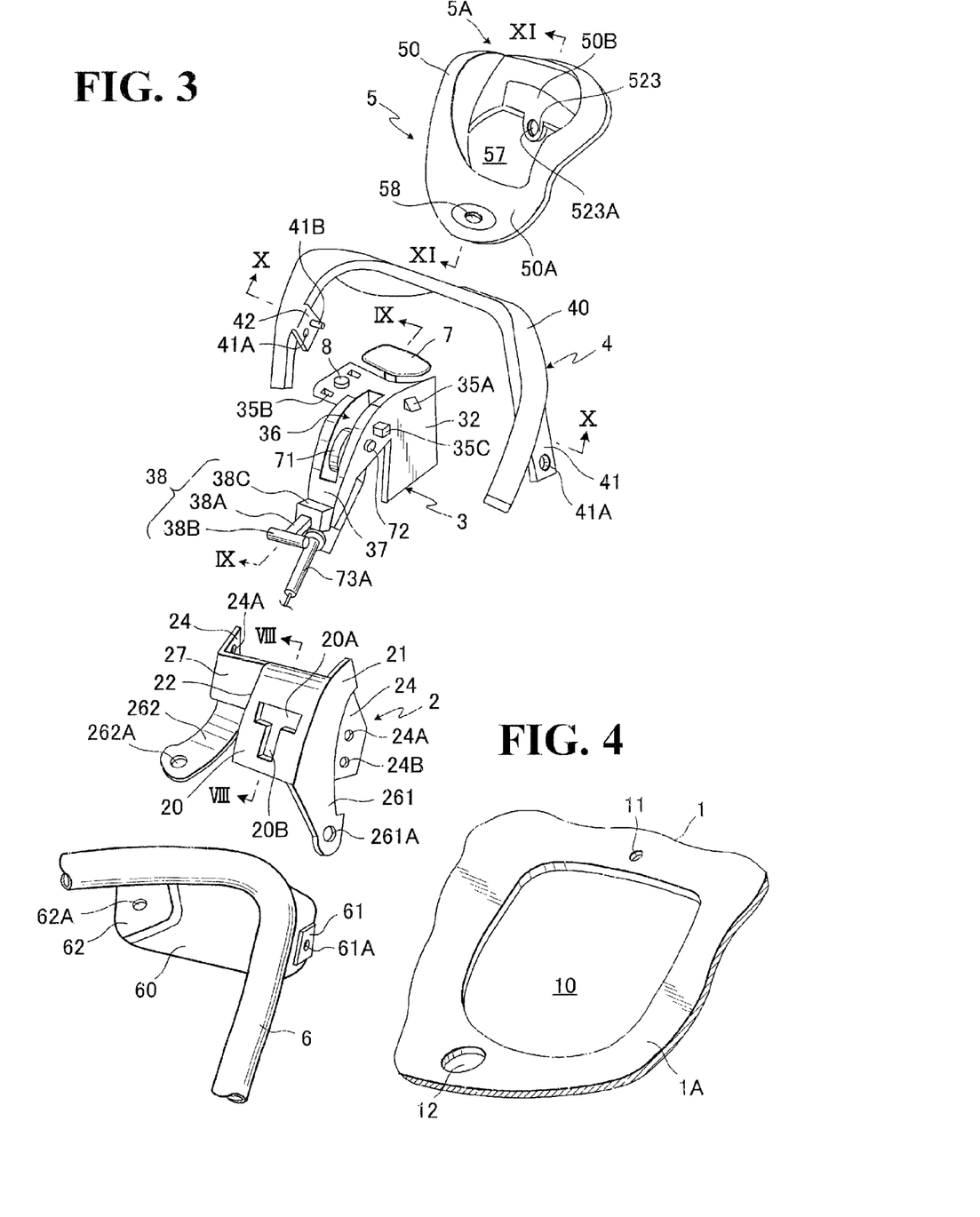
FIG. 3 is a partly broken and exploded perspective view showing the principal constituent elements of the present invention.
FIG. 4 is a partly broken perspective view of a trim cover assembly and opening defined therein, which is used in the present invention.

Thereafter, as understandable from FIGS. 4 and 5, the peripheral region of the previously stated another through-hole (11) of the trim cover assembly (1) is sandwiched between the projected piece (23) of connecting bracket (2) and the connecting extension (332) of the housing (3). The thus-juxtaposed through-hole (11), projected piece (23) and connecting extension (332) are securely connected with one another by means of bolt (123) and nut, whereupon one localized peripheral edge region (1A) associated with the trim cover assembly (1) is firmly attached to the connecting bracket (2).

Next, the bezel (5) is placed upon the upper side of the housing (3), and then, the connecting lug (523) of the bezel (5) is securely connected with the projected piece (23) of connecting bracket (2) by means of bolt (528B) and nut. At that time, it is seen that the two engagement pieces (535B) of the bezel (5) are engaged with the respective two engagement holes (35B) of the housing (3), while the engagement ring (535A) of the bezel (5) is engaged with the engagement projection (35A) of the housing (3). Hence, the bezel (5) is firmly secured at a predetermined position.

In this context, the securing of the foregoing bolts (123) and (528B) can be done by drawing the operating lever (7) in the arrow direction as shown in FIG. 2. In particular, the bolt (528B) can be accessed to the securing point through an opening (320) which is formed in the housing (3) at a point corresponding to the projected piece (23).

During the assembly before and after securing the bezel (5) to the housing (2), a care is taken to insure that all the peripheral edge regions (1A) of trim cover assembly (1), excepting the previously stated connected point corresponding to the through-hole (11), are inserted in a clearance or slit between the bezel (5) and the shape retaining bracket (4).

From the description above, it is to be appreciated that the following advantages and effects are attainable from the present invention.

(i) The provision of the shape retaining bracket (4) effectively stretches and retains the peripheral areas of the opening (10) of trim cover assembly (1), where the operation unit (A) is located, in a shape conforming to the contour of the one upper corner portion (UR) of seat back (SB), without creation of creases and loosely stretched portions therein. Thus, all the top, frontal and lateral surfaces of that one upper corner portion (UR) are neatly and beautifully finished, thereby improving the aesthetic appearance of seat back.

(ii) All the aforementioned connecting parts of the operation unit (A) can easily be connected and assembled together.

(iii) The housing (3) can be located and secured to a proper position of the connecting bracket (2) by adjustingly moving the slide guide portion (38A) of guide member (38) in and along the guide hole (20B) of the connecting bracket (2).

(iv) In particular, due to such arrangement of the slide guide portion (38), the housing (3) can be positively secured to the proper position of connecting bracket (2) at the time when the peripheral edge region (1A) of opening (10) of trim cover assembly (1) is retained between the housing (3) and connecting bracket (2) as described previously. After that assembly, the guide member (38) is contacted with the lower end of the guide hole (20B), thereby serving as stopper to prevent downward movement of the housing (3).

(v) After the shape retaining bracket (4) has been connected with the connecting bracket (4), the housing (3) is connected with the latter (4). Hence, the shape retaining bracket (4) serves as a means for locating and securing the housing (3) to a predetermined position relative to the connecting bracket (4), while serving as a means for protecting the housing (3) against external force applied thereto.

Finally, is should be understood that the present invention is not limited to the illustrated embodiment, but any alternation, replacement and addition may be applied thereto without departing from the scopes of the appended claims.

What is claimed is:

1. An arrangement of an operation unit in a seat back, said seat back comprising:
one upper corner portion having a predetermined outer shape;
a seat back frame including an upper corner frame region disposed corresponding to an upper corner of said seat back;
a padding; and
a trim cover assembly covering said padding,
wherein said operation unit includes an operating lever operatively provided therewith,
wherein said padding has a bore formed therein at a point corresponding to said one upper corner portion of the seat back, and said trim cover assembly has an opening formed therein at a point corresponding to said one upper corner portion of the seat back, wherein a body of said operation unit is disposed within said bore of said padding, and said operating lever is disposed so as to project outwardly from said opening of said trim cover assembly, wherein said trim cover assembly includes a connecting area defined near to said opening thereof, and wherein said operation unit further comprises:
  a connecting bracket of substantially U-shaped configuration, said connecting bracket having a backward side and an opening defined in the backward side, said connecting bracket being fixed to said one corner frame region of said seat back frame;
  said connecting bracket further having a projected portion formed therewith, and a space defined inwardly thereof;
  a housing accommodating a part of said operating lever therein, said housing being arranged such that substantially an entirety of the housing is disposed in said space of said connecting bracket, said housing further having a projected portion formed therewith;
  a shape retaining bracket so configured to contact and retain a peripheral edge region of said opening of said trim cover assembly in a shape conforming to said predetermined outer shape of said one corner portion of said seat back, said shape retaining bracket being securely connected with said connecting bracket and having an inward opening region smaller in size than a substantially circular region circumscribed by said peripheral edge region of said opening associated with said trim cover assembly;
  a bezel, said bezel having has an outer contour smaller in size than said inward opening region of said shape retaining bracket, said bezel being adapted for covering a space between said shape retaining bracket and said operating lever, wherein said peripheral edge region of said opening of said trim cover assembly is inserted between said bezel and said shape retaining bracket, and wherein said projected portion of said connecting bracket, said projected portion of said housing and said connecting area of said trim cover assembly are securely connected with one another.

2. The arrangement as claimed in claim 1, wherein said shape retaining bracket is integrally connected with an outer side of said connecting bracket, wherein said housing has a through-hole formed in said projected portion thereof, and wherein said bezel has a connecting portion firmly connected, via said through-hole of said housing, with said projected portion of said connecting bracket.

3. The arrangement as claimed in claim 2, wherein said housing has a base portion and a pin provided at said base portion, wherein said connecting bracket has a locating hole formed therein, and wherein said pin is inserted in said locating hole.

4. An arrangement of operation unit in a seat back, said seat back comprising:
  one upper corner portion having a predetermined outer shape;
  a seat back frame including an upper corner frame region disposed corresponding to an upper corner of said seat back;
  a padding; and
  a trim cover assembly covering said padding,
wherein said operation unit includes an operating lever operatively provided therewith, wherein said padding has a bore formed therein at a point corresponding to said one upper corner portion of the seat back, and said trim cover assembly has an opening formed therein at a point corresponding to said one upper corner portion of the seat back, wherein a body of said operation unit is disposed within said bore of said padding, with said operating lever is disposed so as to project outwardly from said opening of said trim cover assembly, wherein said trim cover assembly includes a connecting area defined near to said opening thereof, and wherein said operation unit further comprises:
  a connecting bracket of substantially U-shaped configuration, said connecting bracket having a backward side and an opening defined in the backward side, said connecting bracket being fixed to said one corner frame region of said seat back frame, said connecting bracket further having a projected portion formed therewith and a space defined therein;
  a housing accommodating a part of said operating lever therein, said housing being arranged such that substantially an entirety of the housing is disposed in said space of said connecting bracket, said housing further having a projected portion formed therewith;
  a shape retaining bracket so configured to contact and retain a peripheral edge region of said opening of said trim cover assembly in a shape conforming to said predetermined outer shape of said one corner portion of said seat back, and said shape retaining bracket being securely connected with said connecting bracket and having an inward opening region smaller in size than a substantially circular region circumscribed by said peripheral edge region of said opening associated with said trim cover assembly; and
  a bezel, said bezel having an outer contour smaller in size than said inward opening region of said shape retaining bracket, said bezel being adapted for covering a space between said shape retaining bracket and said operating lever, wherein said connecting bracket includes a wall having: a transversely extending insertion hole; and a guide hole which communicates with said transversely extending insertion hole and extends vertically from transversely extending insertion hole, wherein said housing includes a distal end having a substantially T-shaped guide piece provided therewith, said substantially T-shaped guide piece being slidably movable in and along said transversely extending insertion hole and said guide hole, wherein said peripheral edge region of said opening of said trim cover assembly is inserted between said bezel and said shape retaining bracket, and wherein said projected portion of said connecting bracket, said projected portion of said housing and said connecting area of said trim cover assembly are securely connected with one another.

5. The arrangement as claimed in claim 4, wherein said shape retaining bracket is integrally connected with an outer side of said connecting bracket, wherein said housing has a through-hole formed in said projected portion thereof, and wherein said bezel has a connecting portion firmly connected, via said through-hole of said housing, with said projected portion of said connecting bracket.

6. The arrangement as claimed in claim 4, wherein said housing has a base portion, and a pin provided at said base portion, said connecting bracket has a locating hole formed therein, and said pin is inserted in said locating hole.

* * * * *